US005832077A

United States Patent [19]

Ciurpita

[11] Patent Number: 5,832,077

[45] Date of Patent: Nov. 3, 1998

[54] MICROPHONE/LOUDSPEAKER HAVING A SPEAKERPHONE MODE AND A MICROPHONE/LOUDSPEAKER MODE

[75] Inventor: Gregory Ciurpita, Somerset, N.J.

[73] Assignee: Lucent Technologies Inc., Murray Hill, N.J.

[21] Appl. No.: 783,812

[22] Filed: Jan. 16, 1997

Related U.S. Application Data

[63] Continuation of Ser. No. 238,104, May 4, 1994, abandoned.

[51] Int. Cl.[6] .......... H04M 3/56

[52] U.S. Cl. .......... 379/388; 379/158; 379/160; 379/202; 379/420; 370/260

[58] Field of Search .......... 379/201, 202, 379/388, 389, 390, 402, 403, 404, 158, 206, 217, 420, 377, 159, 160; 370/260

[56] References Cited

U.S. PATENT DOCUMENTS

| | | | |
|---|---|---|---|
| 4,184,048 | 1/1980 | Alcaide | 379/388 |
| 4,658,425 | 4/1987 | Julstrom | 381/81 |
| 4,716,585 | 12/1987 | Tompkins et al. | 379/202 |
| 4,764,953 | 8/1988 | Chern et al. | 379/388 |
| 4,899,378 | 2/1990 | Hamer | 379/388 |
| 4,955,055 | 9/1990 | Fujisaki et al. | 379/388 |
| 5,193,107 | 3/1993 | Parker et al. | 379/388 |
| 5,271,057 | 12/1993 | Addeo et al. | 379/202 |
| 5,317,567 | 5/1994 | Champion | 379/202 |
| 5,404,397 | 4/1995 | Janse et al. | 379/202 |

FOREIGN PATENT DOCUMENTS

| | | |
|---|---|---|
| 2 135 557 | 2/1984 | United Kingdom . |
| 2 219 909 | 3/1989 | United Kingdom . |
| WO 83/03512 | 10/1983 | WIPO . |

*Primary Examiner*—Ahmad F. Matar
*Assistant Examiner*—Scott Wolinsky

[57] ABSTRACT

A microphone/loudspeaker includes a microphone arrangement and a loudspeaker such that the microphone/loudspeaker operates in a quiescent mode and shifts to a speakerphone mode in response to detecting a battery voltage on a telephone line. In the quiescent mode the microphone arrangement and the loudspeaker operate substantially independent of each other while in the speakerphone mode they interact on the basis of their respective signal strengths. In a system, the microphone/loudspeaker is connected to other microphone/loudspeakers so that the microphone arrangement of one microphone/loudspeaker couples in tandem to the microphone arrangement of other microphone/loudspeakers, and the loudspeaker of one microphone/loudspeaker couples in tandem to the loudspeaker of other microphone/loudspeakers.

28 Claims, 1 Drawing Sheet

MICROPHONE/LOUDSPEAKER HAVING A SPEAKERPHONE MODE AND A MICROPHONE/LOUDSPEAKER MODE

This is a continuation application of Ser. No. 08/238,104 filed May 4, 1994, now abandoned.

FIELD OF THE INVENTION

This invention relates to microphone/loudspeakers (M/Ls) and systems which use M/Ls, and particularly to systems which use multiple M/L arrangements in large conference rooms and are connected to telephone lines so that attendees in the conference room can communicate with each other and through telephone lines.

BACKGROUND OF THE INVENTION

Large conference rooms require multiple microphone/loudspeakers to provide satisfactory coverage of the room. To communicate with outsiders through telephone lines, outgoing microphone and incoming loudspeaker signals must pass through a speakerphone which makes the correct transmit/receive (tx/rx) state selection to the telephone service. Presently, M/Ls under the name Quorum Stalks have been used in tandem with each other and with speakerphones to achieve these ends. However, such systems are cumbersome.

SUMMARY OF THE INVENTION

According to a feature of the invention a microphone/loudspeaker includes a microphone arrangement, a loudspeaker arrangement, and means to operate as an M/L in the quiescent mode and to shift to a speakerphone mode in response to a battery voltage on a telephone line. In the quiescent mode the microphone arrangement and the loudspeaker arrangement operate substantially independent of each other while in the speakerphone mode they interact on the basis of signal strengths from the microphone and the telephone line.

According to another feature of the invention, the M/L includes means to connect to other M/Ls so that the microphone arrangement of one M/L couples in tandem to the microphone arrangements of other M/Ls, and the loudspeaker arrangement of the M/L couples in tandem to loudspeaker arrangements of other M/Ls.

These and other features of the invention are pointed out in the claims. Other objects of the invention will become evident from the following detailed description when read in light of the accompanying drawings.

DETAILED DESCRIPTION OF PREFERRED EMBODIMENTS

Figure 1:
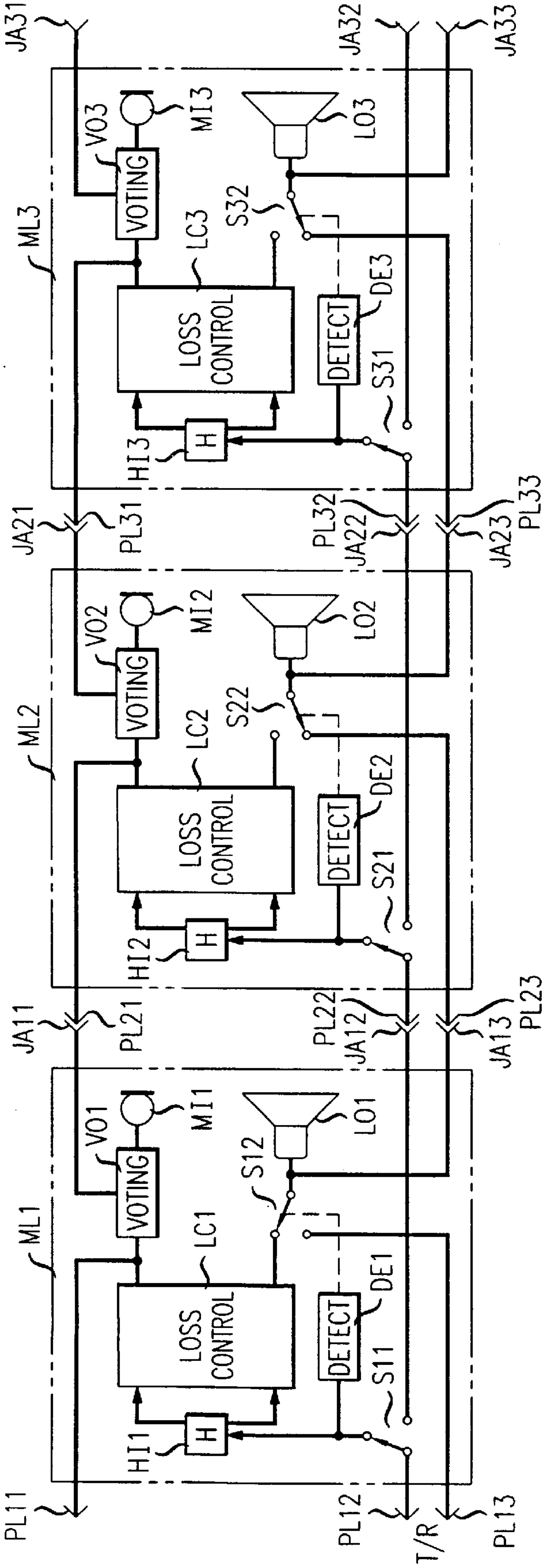
FIG. 1 is a block diagram of a system embodying features of the invention.

FIG. 1 illustrates three identical microphone/loudspeakers ML1, ML2, and ML3 arranged in tandem. For this purpose jacks JA11, JA12, and JA13 on microphone/loudspeaker ML1 are coupled to plugs PL21, PL22, and PL23 on microphone/ loudspeaker ML2, and jacks JA21, JA22, and JA23 on microphone/loudspeaker ML2 are coupled to plugs PL31, PL32, and PL33 on microphone/loudspeaker ML3.

Each microphone/loudspeaker includes structure to permit operation in a speakerphone mode and may thus be regarded as a speakerphone as well as an M/L. Each M/L is adapted to respond automatically to its position in the tandem arrangement and assume either a speakerphone operation or, as appropriate, a microphone loudspeaker operation. Specifically, when the first microphone loudspeaker ML1, when it is off-hook and thus connects to a live telephone line T/R of a telephone service carrying a battery voltage and signals (audio) from a central office, performs a speakerphone operation. The microphone/loudspeakers ML2 and ML3, which cannot connect directly to the telephone line, each perform a microphone loudspeaker/operation.

Microphone/loudspeakers ML1, ML2, and ML3 include respective manually-operated hook switches S11, S21, and S31 which are normally in the on-hook positions. In FIG. 1 the hook switches S11, S21, and S31 all appear in the off-hook positions.

In the microphone/loudspeaker ML1, a conventional speakerphone hybrid HI1 connects to the telephone line T/R through the hook switch S11. When the hook switch S11 is in the off-hook position shown, the hybrid HI1 splits the telephone line T/R so that incoming audio signals pass to a loudspeaker LO1 and so that signals from a microphone MI1 pass to the telephone line. Similarly, in the microphone/loudspeakers ML2, ML3 speakerphone hybrids HI2 and HI3, when operational, split the telephone line (if connected) so that incoming audio signals at switches S21 and S31 pass to loudspeakers LO2 and L03 and so that outgoing signals from microphones MI2 and MI3 pass to the respective switches S21 and S31. The hybrids HI1, HI2, and HI3 connect to conventional speakerphone "variolossers" or loss controls LC1, LC2, and LC3. When connected to the loudspeakers and signals coming from the microphones, the loss controls LC1, LC2, and LC3 each select the stronger of the microphone or received telephone line signals in each microphone/loudspeaker and place loss in the path of the weaker signal. In that way only the stronger signal passes in each microphone loudspeaker. This is standard for present speakerphones and telephone sets. An example of a loss control LC1, LC2, or LC3 is a chip identified as a Motorola MC34118. Each hybrid and loss control in each microphone/loudspeaker constitute the structure that permits operation of the M/L in the speakerphone mode. Together the hybrid and loss control in any of the M/Ls are referred to as a phone control.

Separate, so called, "voting circuits" or "voting units" VO1, VO2, and VO3 lie in the path between the loss controls LC1, LC2, and LC3 and the microphones MI1, MI2, MI3. The voting circuit VO2 selects either the signal of the microphone MI2 or the signal of the voting circuit VO3 based on comparative signal strengths. Voting circuit VO1 selects either the signal from the microphone MI1 or the signal selected by the voting circuit V02 based on signal strength. Voting circuit V03 inherently selects microphone MI3 because it senses no signal at the jack JA31. Voting circuits of this type are part of the CS120A Quorum microphone/loudspeakers available from AT&T. Their operation with microphone/loudspeakers is well known.

Selector switches S12, S22, and S32 at the loudspeaker LO1, LO2, LO3 of microphone loudspeakers ML1, ML2, ML3 respond to actuation by detectors DE1, DE2, and DE3 and assume unactuated positions (down) which connect them to plugs PL13, PL23, and PL33. Jacks JA13 and JA23 then connect the loudspeakers LO1, LO2, and LO3 to each other when the switches S22 and S32 remain unactuated. In the actuated (up) condition the switches S12, S22, and S32 connect the loudspeakers LO1, L02, and LO3 to the loudspeaker output of the loss controls LC1, LC2, and LC3. The detectors DEl, DE2, and DE3 actuate the respective switches S12, S22, and S32 in response to battery voltages on the telephone line at the input to the respective hybrids HI1, HI2, and HI3.

Because the switches S12, S22, and S23 disconnect the loudspeaker LO1, LO2, and LO3 from the loudspeaker outputs of the loss controls LC1, LC2, and LC3 in the unactuated condition, the microphone/loudspeakers ML1, ML2, and ML3 normally (in the unactuated condition of the switches) operate microphone/loudspeaker mode. When any one of detectors DE1, DE2, or DE3 detects a battery voltage on the telephone line T/R, the respective switch S12, S22, or S32 switches (up) to connect the corresponding loudspeaker to the loss control LC1, LC2, or LC3. This places the M/L in the speakerphone mode. In the tandemed arrangement shown, only detector DE1 in microphone/loudspeaker ML1 can respond to a battery voltage on telephone line T/R because it is the only detector that can connect to the line T/R. Hence, only the microphone/loudspeaker ML1 can operate in the speakerphone mode. Microphone/loudspeakers ML2 and ML3, by virtue of their tandemed conditions, operate in the microphone/loudspeaker mode.

Figure 2:
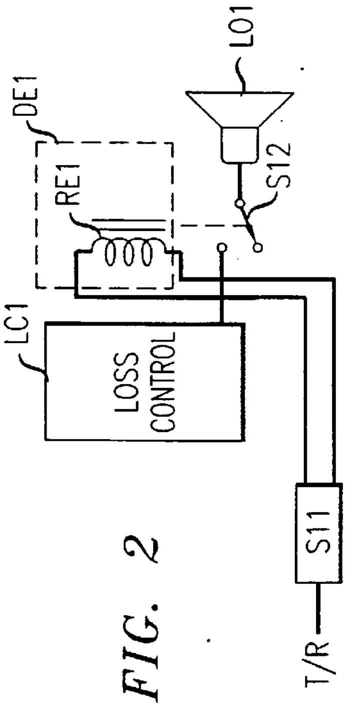
FIG. 2 is a schematic diagram of a switching arrangement for use in the system of FIG. 1.

According to an embodiment of the invention, the detector DE1, DE2, and DE3 are each in the form of a relay coil magnetically coupled to the respective switches S12, S22, and S32. When the relay coils detect no battery voltage from the telephone line T/R, they are unenergized, i.e. the switches S12, S22, and S32 assume the down position connected to plugs PL13, PL23, and PL33. When any one of the relay coils is energized by battery voltage on the telephone line T/R it energizes and lifts the corresponding switch into contact with the loudspeaker connection of the corresponding loss control LC1, LC2, or LC3. An example of a detector DE1 used with the switch S12 appears in FIG. 2. Here, when the relay coil RE1 detects no battery voltage from the telephone line T/R, i.e. it is unenergized, the switch S12 assumes the down position connected to plug PL13. When the relay coil RE1 is energized by battery voltage on the telephone line T/R it lifts the corresponding switch into contact with the loudspeaker connection of the loss control LC1.

According to another embodiment of the invention, the detectors DE1, DE2, and DE3 and the switches S12, S22, and S32 are in the form of solid state devices such as transistors, field effect transistors (FETs), MOSFETs, optoisolators, etc. The solid state devices of the detectors cause conduction of transistors representing a state of a corresponding switch S12, S23, or S32. A full wave rectifier bridge in the detectors makes sure that the solid state devices receive the proper polarity of current.

According to yet another embodiment of the invention, the detectors DE1, DE2, and DE3 are parts of respective chips each of whose logic controls connection of the corresponding loudspeaker LO1, L02, or L03 to the loss control or plug PL13, PL23, or PL33. Respective chips may have other parts such as the hybrids HI1, HI2, and HI3, and the loss control LC1, LC2, and LC3.

According to an embodiment of the invention the hook switches S11, S21, and S31 operate together with switches (not shown) that turn the M/Ls on and off electrically. In the on-hook positions the M/Ls are off, and in the off-hook positions they are on.

In operation the three off-hook microphone/loudspeakers ML1, ML2, and ML3 are first connected in tandem by connecting the plugs PL21, PL22, PL23 and PL31, PL32, PL33 to the respective jacks JA11, JA12, JA13 and JA21, JA22, JA23. Plugs PL11, PL13, and jacks JA31, JA32, and JA33 remain unconnected. Additional or fewer microphone/loudspeakers may be connected in tandem. When the microphone/loudspeakers ML1, ML2, and ML3 are on-hook the detectors DE1, DE2, and DE3 remain unactuated and the switches S12, S23, and S32 remain in the down position in connection with the respective plugs PL13, PL23, and PL33. In this condition the microphone/loudspeakers ML1, ML2, and ML3 are in the microphone/loudspeakers operating mode.

The left-most microphone/loudspeaker ML1 is now connected to the telephone line T/R from a telephone central office, and placed off-hook by switching the switch S11 to the left. The other switches S21 and S31 are also set off-hook but their connections through plug PL22 and jack JA12 prevents their connection to the line T/R. Only the switch S11 can produce physical connection to the line T/R.

Connection of the switch S11 to the line T/R causes response by the detector DE1. The latter lifts the switch S12 to connect the loudspeaker line of the loss control LC1 to the loudspeaker L01. This places the microphone/loudspeaker ML1 in the speakerphone mode. However, it leaves the microphone/loudspeakers ML2 and ML3 in the microphone loudspeaker mode, because no T/R voltage from the line T/R can actuate the detectors DE2 and DE3. As a whole this results in a microphone/loudspeaker ML1 connected to the line T/R and two loudspeaker-microphones all connected in tandem.

All the loudspeakers LO1, LO2, and LO3 now receive audio signals from the loudspeaker output of the loss control LCl in the only microphone/loudspeaker ML1 operating in the speakerphone mode. The microphones and loudspeakers all include amplifiers (not shown) as needed.

The microphone MI3 is connected to the voting unit VO2 of the microphone MI2. The voting unit VO2 selects either its own microphone (MI2) signal or the one from microphone MI3 based on signal strength. The voting unit VO1 selects the signal from the microphone MI1 or the selected signal from microphones MI2 and MI3 based on signal strength. Based on the selected microphone signal and the received signal on the line T/R, the loss control performs the appropriate speakerphone lossing operation.

According to one embodiment of the invention, the microphones are single microphone units. In another embodiment of the invention, the microphones MI1, MI2, and MI3 are each in the form of a set of plural microphone units aimed outwardly in distributed radial directions to achieve omnidirectional sensitivity. For each set, selection circuits choose the radially directed microphone units subjected to the maximum input for operation for any moment while suppressing others at that time.

The term hook switch as used herein is often referred to as switchhook.

While embodiments of the invention have been described in detail, it will be evident by those skilled in the art that the invention may be embodied otherwise without departing from its spirit and scope.

What is claimed is:

1. A microphone/loudspeaker to be selectively coupled to a telephone line and to a plurality of other microphone/loudspeakers, said microphone/loudspeaker being either in a microphone/loudspeaker mode in which said microphone/loudspeaker is disconnected from the telephone line, or in a speakerphone mode in which said microphone/loudspeaker is connected to the telephone line, said microphone/loudspeaker comprising:

a microphone arrangement;

a loudspeaker arrangement;

a phone control coupled to said microphone arrangement, said phone control being responsive to a voltage on the telephone line when the microphone/loudspeaker is in the speakerphone mode; and a selection arrangement responsive to a voltage on the telephone line when the microphone/loudspeaker is in the speakerphone mode, said selection arrangement having a first state and a second state;

said loudspeaker arrangement being decoupled from said phone control in the first state of said selection arrangement so as to place the microphone/loudspeaker in the microphone/loudspeaker mode, and said microphone/loudspeaker arrangement being coupled to said phone control in the second state of said selection arrangement so as to place the microphone/loudspeaker in the speakerphone mode.

2. A microphone/loudspeaker as in claim 1, wherein said microphone arrangement includes a microphone, a voting circuit responsive to signals from the microphone and to signals from the plurality of microphone/loudspeakers.

3. A microphone loudspeaker as in claim 1, wherein said microphone/loudspeaker further comprises a hook switch connected to said phone control.

4. A microphone/loudspeaker as in claim 1, wherein the plurality of microphone/loudspeakers each includes an internal loudspeaker arrangement, said loudspeaker arrangement includes means for connecting said loudspeaker to the internal loudspeakers of the plurality of microphone/loudspeakers.

5. A microphone/loudspeaker as in claim 1, wherein the plurality of microphone/loudspeakers each includes an internal loudspeaker, and wherein said selection arrangement includes a switch having a first position in which said switch connects said loudspeaker to one of said internal loudspeakers in the microphone/loudspeaker mode and in which said switch connects said loudspeaker to other internal loudspeakers of the plurality of microphone/loudspeakers in the speakerphone mode.

6. A microphone/loudspeaker as in claim 1, wherein said microphone arrangement includes a microphone, a voting circuit responsive to signals from the microphone and to signals from the other microphone/loudspeakers, and means for connecting said voting circuit to voting circuits in other microphone/loudspeakers, said microphone/loudspeaker further comprises a hook switch connected to said phone control, said the plurality of microphone/loudspeakers includes internal loudspeakers, said selection arrangement includes a switch having a first position in which said switch connects said loudspeaker to one of said internal loudspeakers in the microphone/loudspeaker mode and in which said switch connects said loudspeaker to other internal loudspeakers of the plurality of microphone/loudspeakers in the speakerphone mode.

7. A system, comprising:

a plurality of microphone/loudspeakers;

means in each of said microphone/loudspeakers for placing said microphone/loudspeakers in a microphone/loudspeaker mode in an on-hook condition, and into a speakerphone mode in response to voltages indicating that the microphone/loudspeaker has been placed in an off-hook condition and is connected to an active telephone line, and means for connecting said microphone/loudspeakers in tandem to each other and connecting only one of said microphone/loudspeakers into a speakerphone mode in response to voltages indicating that the microphone/loudspeaker has been placed in an off-hook condition and is connected to an active telephone line.

8. A system as in claim 7, wherein said microphone/loudspeakers each includes a microphone arrangement and a loudspeaker arrangement, and wherein said means for connecting connects said loudspeaker arrangement of each microphone/loudspeaker to a loudspeaker arrangement in another of said microphone/loudspeakers, and said microphone arrangement of one microphone/loudspeaker connects to a microphone arrangement of another microphone/loudspeaker.

9. A system as in claim 7, wherein said microphone/loudspeakers each includes:

a microphone arrangement connected to a microphone arrangement in another of the plurality of microphone/loudspeakers;

a loudspeaker arrangement connected to a loudspeaker arrangement in another of the plurality of microphone/loudspeakers;

a phone control coupled to said microphone arrangement and responsive to the telephone line and coupled to said loudspeaker in the speakerphone mode and decoupled form said loudspeaker in the microphone loudspeaker mode.

10. A system as in claim 7, wherein said microphone/loudspeakers each includes:

a microphone arrangement connected to a microphone arrangement in another of the plurality of microphone/loudspeakers;

a loudspeaker arrangement connected to a loudspeaker arrangement in another of the plurality of microphone/loudspeakers;

a phone control for coupling to a telephone line and coupled to said microphone arrangement; and selection arrangement to be coupled to a telephone line and to a plurality of other microphone/loudspeakers, and to operate either in a microphone/loudspeaker mode which it is disconnected from the telephone line and a speakerphone mode in which it is connected to a telephone line;

said loudspeaker arrangement being decoupled from said phone control in the first state of said selection arrangement when the microphone/loudspeaker is connected to the telephone line and in speakerphone mode, and coupled to said phone control in another state of said selection arrangement responsive to signals from the microphone and to signals from the plurality of microphone/loudspeakers.

11. A system as in claim 10, wherein in each of said microphone/loudspeakers said microphone arrangement includes a microphone, a voting circuit responsive to signals from the microphone and to signals from the other microphone/loudspeakers.

12. A system as in claim 10, wherein in each of said microphone/loudspeakers a hook switch is connected to said phone control.

13. A system as in claim 10, wherein in each of said microphone/loudspeakers said loudspeaker arrangement includes a loudspeaker and means for connecting said loudspeaker to other loudspeakers in the plurality of microphone/loudspeakers.

14. A system as in claim 10, wherein in each of said microphone/loudspeakers said loudspeaker arrangement includes a loudspeaker and first means for connecting said loudspeaker to a first of said other loudspeakers and said selection arrangement includes second means for connecting said loudspeaker to loudspeakers in other microphone/loudspeakers.

15. A system as in claim 10, wherein in each of said microphone/loudspeakers said microphone arrangement includes a microphone, a voting circuit responsive to signals from the microphone, and means for connecting said voting circuit to voting circuits in other microphone/loudspeakers, said microphone/loudspeaker further comprises a hook switch connected to said phone control.

16. A system as in claim 10, wherein in each of said microphone/loudspeakers said loudspeaker arrangement includes first means for connecting said loudspeaker to a loudspeaker in a first of said plurality of said microphone/loudspeakers and said loudspeaker in each of said microphone/loudspeakers includes second means for connecting said loudspeaker to a loudspeaker in a second of the plurality of microphone/loudspeakers, said microphone arrangement includes a microphone, a voting circuit responsive to signals from the microphone, and means for connecting said voting circuit to voting circuits in other microphone/loudspeakers, each of said microphone/loudspeaker further comprises a hook switch connected to said phone control.

17. A microphone loudspeaker (M/L), comprising:

a microphone;

a loudspeaker;

a hybrid/loss-control (h/lc) coupled to the microphone;

an input for connection to a first adjacent M/L;

an output for connection to a second adjacent M/L; and a switching arrangement having a first state in which the input connects to the output and the loudspeaker is decoupled from the h/lc so that the loudspeaker and the microphone operate independently in an M/L mode in the absence of a telephone signal at the input, and a second state in which the input connects to the h/lc and the loudspeaker is coupled to the h/lc in response to a telephone signal at the input so that both the microphone and loudspeaker connect to the h/lc and hence the loudspeaker and microphone operate in the M/L mode.

18. An M/L as in claim 17, wherein a voting circuit is responsive to signals from the microphone and to signals from one of said input and said output when one of said input and output is connected to one of said first adjacent M/L and said second adjacent M/L.

19. An M/L as in claim 17 wherein said switching arrangement includes a hook switch to connect said input to said h/lc in the speakerphone mode and to connect said input to said output in the M/L mode.

20. An M/L as in claim 19, wherein said switching arrangement includes a loudspeaker switch responsive to said hook switch for connecting said loudspeaker to said output in the speakerphone mode.

21. An M/L as in claim 17, wherein said switching arrangement includes a loudspeaker switch having a first position in which said loudspeaker switch connects said loudspeaker to said input in the M/L mode and a second position in which said loudspeaker switch connects said loudspeaker to said h/lc in the speakerphone mode.

22. An M/L as in claim 17, wherein a voting circuit is responsive to signals from the microphone and to signals from the output, said voting circuit being connected to said input, said switching arrangement further includes a hook switch to connect said input to said h/lc in the speakerphone mode and to connect said input to said output in the M/L mode, said switching arrangement further includes a loudspeaker switch having a first position in which said loudspeaker switch connects said loudspeaker to said input in the M/L mode and a second position in which said loudspeaker switch connects said loudspeaker to said h/lc in the speakerphone mode.

23. A microphone/loudspeaker (M/L), comprising:

a speakerphone;

an input connected to the speakerphone for connection to a first adjacent M/L;

an output connected to the speakerphone for connection to a second adjacent M/L;

a microphone in the speakerphone and coupled to the output;

a loudspeaker in the speakerphone and selectively coupled to the output;

a hybrid/loss-control (h/lc) in the speakerphone and coupled to the microphone; and a switching arrangement in the speakerphone responsive to a telephone energizing signal at the input, the loudspeaker being connected to the h/lc in response to the energizing signal, and the loudspeaker being connected to the input and disconnected from the h/lc in the absence of a telephone energizing signal at the input.

24. An M/L as in claim 23, wherein a voting circuit is responsive to signals from the microphone and to signals from one of said input and said output when one of said input and said output is connected to one of said first adjacent M/L and said second adjacent M/L.

25. An M/L as in claim 23, wherein said switching arrangement includes a hook switch to connect said input to said h/lc in the speakerphone mode and to connect said input to said output in the M/L mode.

26. An M/L as in claim 25, wherein said switching arrangement includes a loudspeaker switch responsive to said hook switch for connecting said loudspeaker to said output in the speakerphone mode.

27. An M/L as in claim 23, wherein said switching arrangement includes a loudspeaker switch having a first position in which said loudspeaker switch connects said loudspeaker to said input in the M/L mode and a second position in which said loudspeaker switch connects said loudspeaker to said h/lc in the speakerphone mode.

28. An M/L as in claim 23, wherein a voting circuit is responsive to signals from the microphone and to signals from the output, said voting circuit being connected to said input, said switching arrangement further includes a hook switch to connect said input to said h/lc in the speakerphone mode and to connect said input to said output in the M/L mode, said switching arrangement further includes a loudspeaker switch having a first position in which said loudspeaker switch connects said loudspeaker to said input in the M/L mode and a second position in which said loudspeaker switch connects said loudspeaker to said h/lc in the speakerphone mode.

* * * * *